US008099787B2

(12) United States Patent
Vasudeva

(10) Patent No.: US 8,099,787 B2
(45) Date of Patent: Jan. 17, 2012

(54) KNOWLEDGE-BASED AND COLLABORATIVE SYSTEM FOR SECURITY ASSESSMENT OF WEB APPLICATIONS

(75) Inventor: Weimin Vasudeva, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 915 days.

(21) Appl. No.: 11/839,080

(22) Filed: Aug. 15, 2007

(65) Prior Publication Data
US 2009/0049553 A1    Feb. 19, 2009

(51) Int. Cl.
G06F 15/18    (2006.01)
(52) U.S. Cl. .............................. 726/25; 726/4; 713/155
(58) Field of Classification Search ...................... 726/25
See application file for complete search history.

(56) References Cited

U.S. PATENT DOCUMENTS

| | | | |
|---|---|---|---|
| 7,178,166 B1* | 2/2007 | Taylor et al. ................... 726/25 |
| 2004/0073445 A1* | 4/2004 | Mellinger et al. ................ 705/1 |
| 2004/0221176 A1* | 11/2004 | Cole ............................. 713/201 |
| 2005/0066195 A1* | 3/2005 | Jones ........................... 713/201 |
| 2005/0066196 A1* | 3/2005 | Yagi ............................. 713/201 |
| 2005/0234755 A1* | 10/2005 | Baggett et al. ................... 705/7 |
| 2006/0117388 A1 | 6/2006 | Nelson et al. |
| 2006/0259972 A2* | 11/2006 | Oliphant ........................ 726/25 |
| 2006/0259973 A1* | 11/2006 | Sima et al. ...................... 726/25 |
| 2006/0282897 A1* | 12/2006 | Sima et al. ...................... 726/25 |
| 2007/0081197 A1* | 4/2007 | Omoigui ........................ 358/403 |
| 2007/0143271 A1* | 6/2007 | Yuval et al. ...................... 707/3 |
| 2007/0150958 A1* | 6/2007 | Choi et al. ....................... 726/25 |
| 2009/0126022 A1* | 5/2009 | Sakaki ............................ 726/25 |

OTHER PUBLICATIONS

International Search Report in corresponding PCT Application, International Application No. PCT/US2008/073021, mailed Jan. 13, 2009.
International Preliminary Report on Patentability and Written Opinion in corresponding PCT/US2008/073021 dated Feb. 25, 2010.
Fault Tree Analysis, http://www.faulttree.org.
Fault Tree Analysis Software Package: http://www.isograph-software.com/prodsumm.htm.
Threat Risk Modeling, http://www.owasp.org/index.php/Threat_Risk_Modeling.
Josh Dehlinger, Robyn R. Lutz, "PLFaultCAT: A Product-Line Software Fault Tree Analysis Tool" www.cs.iastate.edu/-rlutz/publications/ase06.pdf.
Tom Sabanosh, "Tool Interoperability and Data Translation Mechanisms Using XML/XSL", www.cs.virginia.edu/-evans/cs655/projects/sabanosh.ppt, Apr. 2001.

(Continued)

*Primary Examiner* — Kambiz Zand
*Assistant Examiner* — Yonas Bayou
(74) *Attorney, Agent, or Firm* — Banner & Witcoff, Ltd.; Michael A. Springs

(57) ABSTRACT

A standardized system for assessing the security of web based applications which has a component for collecting information regarding threat and vulnerabilities to web applications is described. The system includes a component for organizing the information regarding threat and vulnerabilities to web applications into a uniform language so that the information is integrated throughout the entirety of the system. Further, the system has a component for expressing the information in a structured and uniform format of a hierarchical relationship between threat and vulnerabilities which includes threat vulnerability trees. The system includes a component for rating the threats and vulnerabilities under a uniform rating system. The system includes a component for integrating the information into both a storage component and also a presentation component for presenting the information. The presentation component presents the information in a graphical format which visually demonstrates the relationships between the threats and the vulnerabilities.

14 Claims, 9 Drawing Sheets

OTHER PUBLICATIONS

Richard Saucier, "Fault Tree Representation and Evaluation", Army Research Laboratory, Mar. 2003.

Allen Long, "Beauty & The Beast—Use and Abuse of Fault Tree as a Tool", http://fault-tree.net.

Guy Helmer, Johnny Wong, Mark Slagell, Vasant Honavar, Les Miller, Yanxin Wang, "A Software Fault Tree and Colored Petri Net Based Specification, Design and Implementation of Agent-Based Intrusion Detection Systems", Iowa State University & Jet Propulsion Laboratory, Jun. 5, 2002.

Masswood Towhidnejad, Dolores R. Wallac, Albert M. Gallo, "Fault Tree Analysis for Software Design", Proceedings of the 27th Annual NASA Goddard/IEEE Software Engineering Workshop 2002.

Jan Steffan, Markus Schumacher, "Collaborative Attack Modeling" ACM 2002.

Josef Jelinek, P. Slavik, "XML Visualization using Tree Rewriting", ACM 2004.

Christian Wagner, Karen S.K., Cheung, Rachael K.F. "Building Semantic Webs for e-Government with WiKi Technology", Electronic Government, vol. 3, No. 1, 2006.

Bernhard Kaiser, Peter Liggesmeyer, Oliver Mackel, "A New Component Concept for Fault Trees", 8th Australian Workshop on Safety Critical Systems and Software (SCS '03), Canberra, 2003.

Examination Report issued in corresponding United Kingdom Application No. 1004104.4, dated Sep. 20, 2011.

* cited by examiner

TABLE 1. TAGS AND ATTRIBUTES OF TVML

| MEANING | ELEMENT | ATTRIBUTES | VALUE TYPE | EXAMPLE |
|---|---|---|---|---|
| TV TREE | TVT | -NAME | STRING | <TVT NAME="XSS"> <br> ... <br> </TVT> |
| VULNERABILITY | V | -NAME <br> -RATING <br> -DREADSCORE <br> -DID <br> (DOCUMENTATION ID) | STRING <br> STRING <br> ARRAY[] <br> STRING | <V NAME="AUTHENTICATED-XSS" RATING="IMPORTANT" DREADSCORE="3, 4, 4, 4, 3" DID="XSS" /> <br> THIS IS AN EMPTY TAG |
| SERIES | S | | | <S> <br> ... <br> </S> |
| PARALLEL | P | -RELATION | STRING | <P RELATION="AND"> <br> ... <br> </P> |
| SUB TREE | SUB_TVT | -NAME | STRING | <SUB_TVT NAME="POOR-INPUT-OUTPUT-VALIDATION-TVT"/> <br> THIS IS AN EMPTY TAG. |

FIG. 6

KNOWLEDGE-BASED AND COLLABORATIVE SYSTEM FOR SECURITY ASSESSMENT OF WEB APPLICATIONS

BACKGROUND

Internet security is a paramount concern for many business and individuals. Daily activities of such business and individuals may depend heavily on the use of "web based" applications. Therefore, the security of such web applications is important. Hence, web applications are tested and assessed to determine whether they are secure. However, there are fundamental problems with the current approaches to security assessment of web applications. By way of background, existing security assessments tend to be manual processes where security analysts examine web applications. The most common approaches used to assess web application security are security penetration testing and source code security review. With the assistance of automatic scanning tools, web application security analysts are able to discover exploitable flaws in web applications and also pinpoint the defects in the source code.

However, there is no uniform or consistent standard or system by which to measure, assess or rate vulnerabilities in or threats to web applications. As a result of the lack of a uniform or consistent standard, the assessment and rating of vulnerabilities and threats vary from one security analyst to another. Similarly, the recommendations in regard to these vulnerabilities and threats also vary from one security analyst to another. For example, two different security analysts assessing the same web application may provide entirely different assessments, ratings, and recommendations for the same web application. This inconsistency in the assessment, rating and recommendations relating to vulnerabilities and threats has negative impacts on the overall value gained from the assessments.

Further, the lack a uniform or consistent standard or system makes integration of the assessments difficult. Without uniformity, the ability to integrate the assessments with each other or with other knowledge is hampered. For example, different assessments may use using different terminologies for the same vulnerability or threat or related aspect. Hence, integration would be difficult.

A further concern in the assessment of security of web based applications results from the fact that security evaluation of web based applications is complex. Detecting potential security vulnerabilities is a process that requires creativity and a thorough knowledge of the entire system, its parts and their interdependencies. Therefore, the quality of a security assessment heavily depends on security analysts' skills and experiences. However, thorough knowledge of the entire system is usually spread over many different areas of expertise. The experts in particular areas are not necessarily in contact with each other and therefore collaboration and sharing of information between different groups may be difficult.

Similarly, the experts in security evaluation are usually not the same people who design, develop and administrate web applications. Therefore, a designer may design a web application without knowledge of potential security vulnerabilities. In practice, it is very common for a system's security to be compromised through a path its designer never have though of. Security analysts who test the web application may realize the potential vulnerabilities and give feedback to a designer to make particular changes. However, this process has at drawbacks. First, the feedback to the web designer is isolated or "in a vacuum" so to speak. For example, a designer may not know why he is being told to make those changes. Without knowing the reason behind the proposed changes to the design, the designer is not apt to remember or incorporate such features in a subsequent design for another web based application. This may lead to the designer designing the same flaw into the next web application. Therefore, the same process will have to be repeated in the next web application due to the same flaw. This is redundant and wasteful. Secondly, the process does not provide the designer the ability to learn of vulnerabilities prior to designing the web application. It would be more efficient for the designer to avoid the problem in the first place. In other words, if the designer could learn of the potential vulnerabilities before designing the web application, they could avoid the vulnerability at the outset.

SUMMARY

There exists a need for a standardized and more efficient system for evaluating and assessing web application security. Therefore, one aspect of this disclosure relates to a knowledge-based approach to improve the quality and efficiency of web application security assessment. This knowledge-based system may use one or more Threat-Vulnerability Trees (TVTs) to describe web application threats, vulnerabilities and the relationship between the threats and vulnerabilities. The TVT provides a structured and reusable format, or standard, by which the threats, vulnerabilities and the relationship between the threats and vulnerabilities may be expressed.

Another aspect of this disclosure relates to a language specifically designed to describe the web application threats and vulnerabilities. This language provides a standard which ensures security analysts always refer to the same threat-vulnerability models of web application systems with the same terms.

Another aspect of this disclosure relates to a uniform rating system for rating threats and vulnerabilities. As a result of this uniform rating system, security analysts rate threats and vulnerabilities consistently.

Another aspect of this discloses relates to the ability to integrate the knowledge collected with other parts of the system.

Another aspect of this disclosure is to involve more experts to include their experience in a particular area. It is useful to have a thorough knowledge of the system and its interdependencies in attempting to detect potential security vulnerabilities. Therefore, with more experts from different fields contributing, the more likely it is that security flaws are discovered.

Another aspect of this disclosure relates to extending such a knowledge-based system to create a collaborative tool that makes expert knowledge about typical vulnerabilities and threats available to developers, software designers, configuration management groups, security analysts. By making such knowledge available to such persons, vulnerabilities are eliminated early on in the development process. This tool may combine a graph-based threat-vulnerability tree modeling technique with a web-based collaborative tool. Such a graphically based tool will make it easier to understand threats, vulnerabilities and their relationships.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

FIG. 6 is a table of examples of tags and attributes of Threat Vulnerability Markup-Language according to at least one aspect of the invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
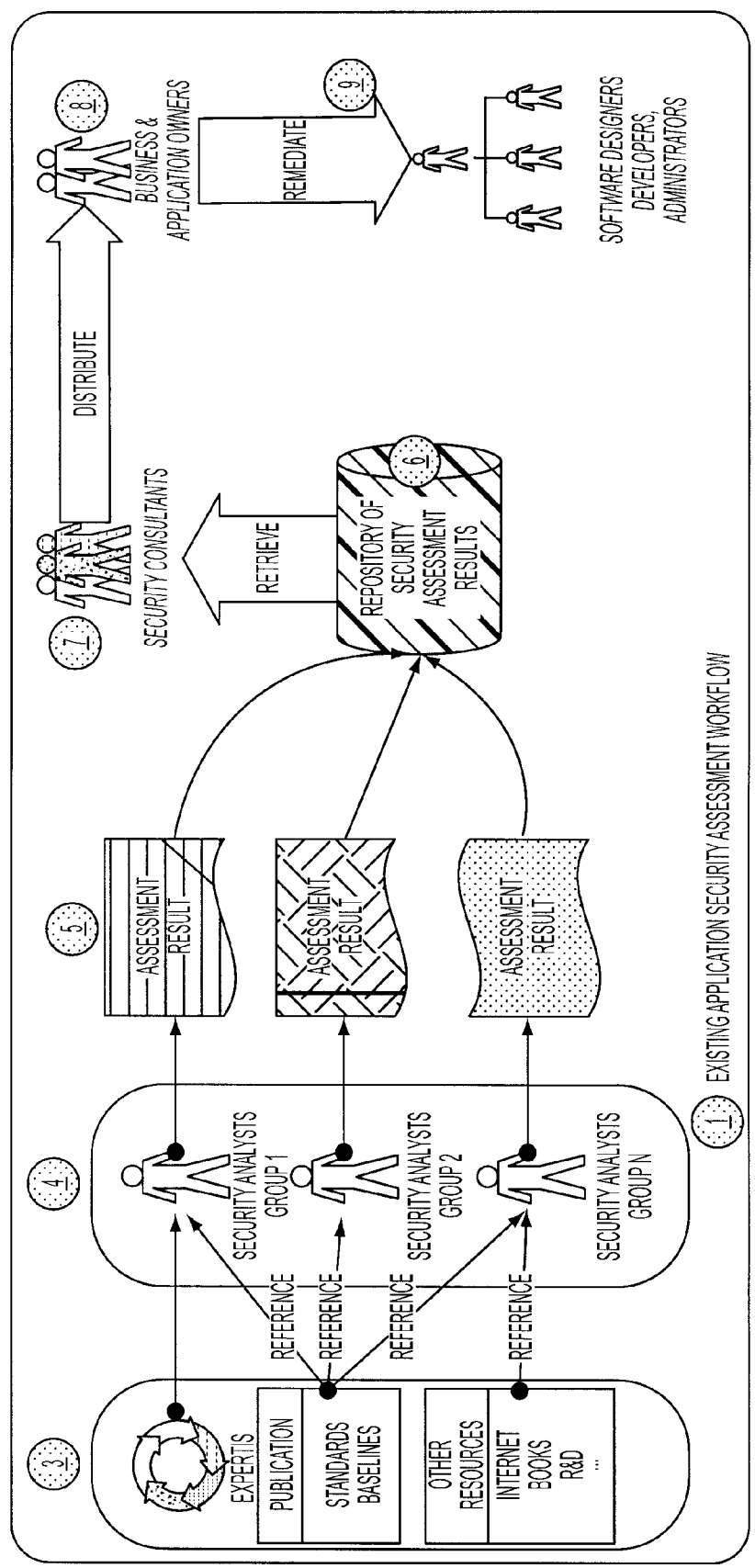
FIG. 1 is a diagrammatic representation of an existing workflow for web application security assessment.

FIG. 1 is a diagrammatic representation of an existing web application security assessment workflow 1 in, for example, a business, or enterprise. As shown in FIG. 1, fragmented and disconnected knowledge 3 is scattered among written texts and spread across several different department and disciplinary boundaries. This disconnected knowledge is distributed piecemeal to groups of security analysts 4. Security analysts 4 are people that perform security analysis, such as discovering vulnerabilities in and threats to applications. The security analysts 4 use their expertise and skill to test the security of web applications. The security analysts 4 then prepare assessment results 5 based on their testing. The quality of the assessment results 5 depends heavily on the analysts' expertise in the particular area. The assessment results 5 include priority rankings to threats and vulnerabilities, recommendations to fix such vulnerabilities and security coding practices. However, such rankings and recommendations are often inconsistent and vary based on the particular analyst. The assessment results 5 are deposited into a repository 6. The repository 6 is either simple file storage or a database. Security consultants 7 represent the information security division of an enterprise. The security consultants 7 liaison with application owners and business owners 8 for gathering security requirements and help resolve security related issues. They are also responsible for retrieving security assessment results from 6 and distributing them to business and application owners 8. The business owners 8 are responsible for the data timeliness, data quality and guidelines associated with the web application. Application owners 8 are responsible for maintaining the application infrastructure, including both hardware and software. The business and application owners 8 then relay the assessment results to the application architects, developers, designers and administrators 9. The application architects, developers, designers and administrators 9 are persons responsible for designing, developing, deploying and maintaining of the applications.

As can be seen in the above diagram, such a system presents several drawbacks. First, the quality of the security assessments 5 and subsequent recommendations suffers for many reasons. For example, there is no uniform or consistent standard for threat/vulnerability definitions, assessments, priority rankings, etc. Therefore, the quality of a security assessment depends on the individual analyst's personal expertise. Hence, inconsistency is extremely prevalent among different assessments 5. Another drawback is that knowledge from the security assessment 5 cannot be integrated with other knowledge because of the lack of uniformity. For example, security assessments using different terminologies for the same vulnerability or threat or related aspect are difficult to integrate with results from different types of security assessments/projects. Yet another drawback with the current system is that the assessment results 5 are presented are in sequential format reports that are difficult to interpret. Therefore, the presentation of the reports is limited in scope and puts the onus on the reader for interpretation and analysis. Yet another drawback is the lack of the designers' ability to learn from the security experts prior to designing the web application. Finally, another drawback to the system is that there is no mechanism to capture and maintain evolving knowledge.

The Knowledge-Based and Collaborative system for web application security assessments has several advantages over the above described system. First, the Knowledge-Based and Collaborative system creates a centralized knowledge base for assimilation and dissemination of knowledge. This knowledge may be presented in a novel Threat-Vulnerability Tree (TVT). The TVT provides a structured and reusable format, or standard, by which the threats, vulnerabilities and the relationship between the threats and vulnerabilities may be expressed. This standard provides consistent evaluations. Further, this systematic and consistent approach also lends itself for easy integration with different kinds of security predicates. Also, this system provides standardized threat/vulnerability priority rankings and definitions and uniformity in recommendations.

Further, the system provides a collaborative tool for sharing the information among a varied set of users. This increases application security awareness and helps train software architect, developers and administrators. The system may include information visualization. Information visualization is the enhanced visual presentation and graphical analysis of vulnerability/threat relationships. It helps users gain a deeper understanding of the contents of a domain by revealing previously unknown facts and relationships or explanations for complex situations. This tool may combine a graph-based TVT modeling technique with a web-based collaborative tool. Therefore, another advantage of this system is the rapid identification of security issues early in the software development life cycle. Yet another advantage is the centralized repository to recycle knowledge gained from feedback and which aids in evolving the system.

Figure 2:
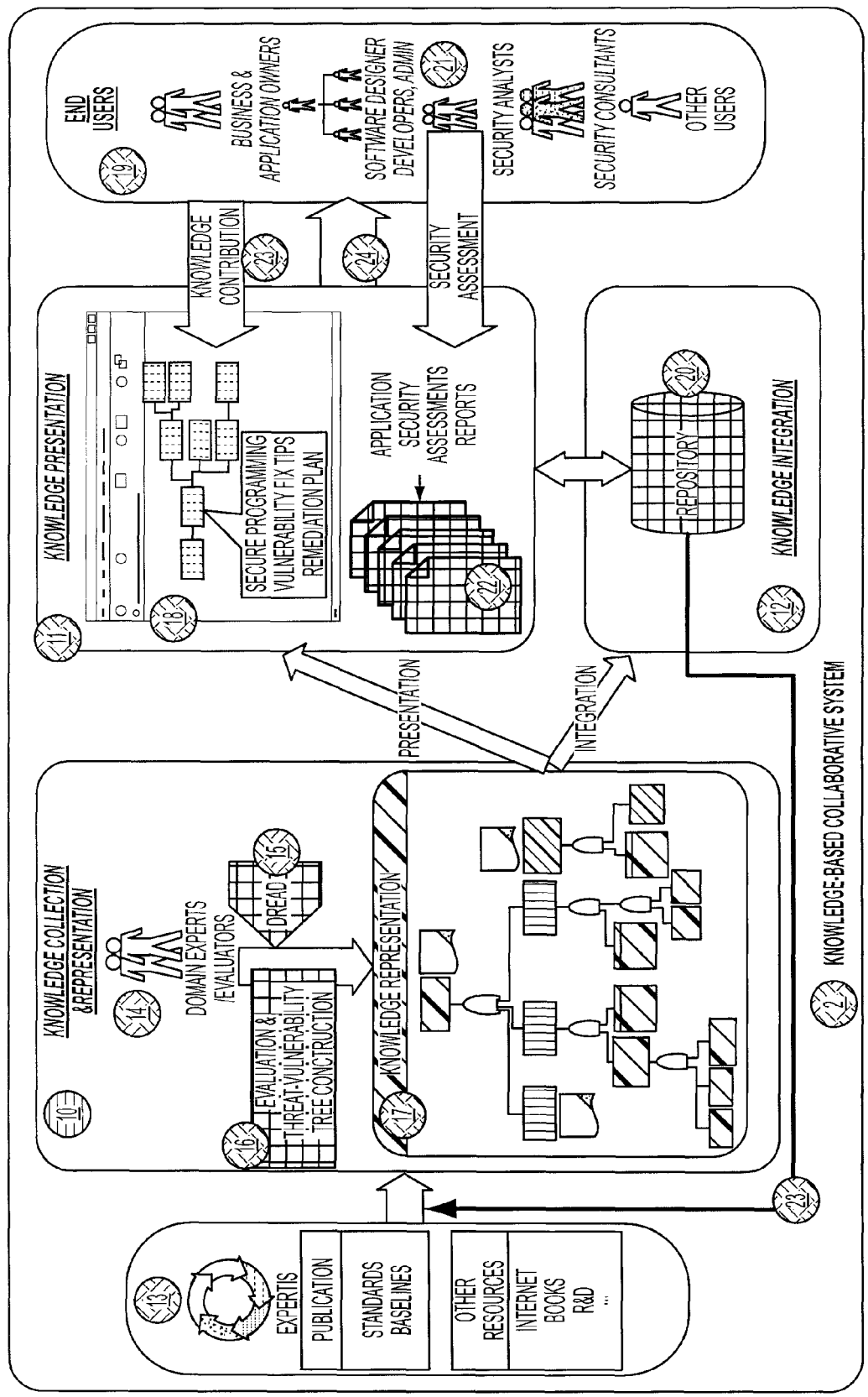
FIG. 2 is a diagrammatic representation of a Knowledge-Based Collaborative System for web application security assessment according to at least one aspect of the invention.
Figure 8:
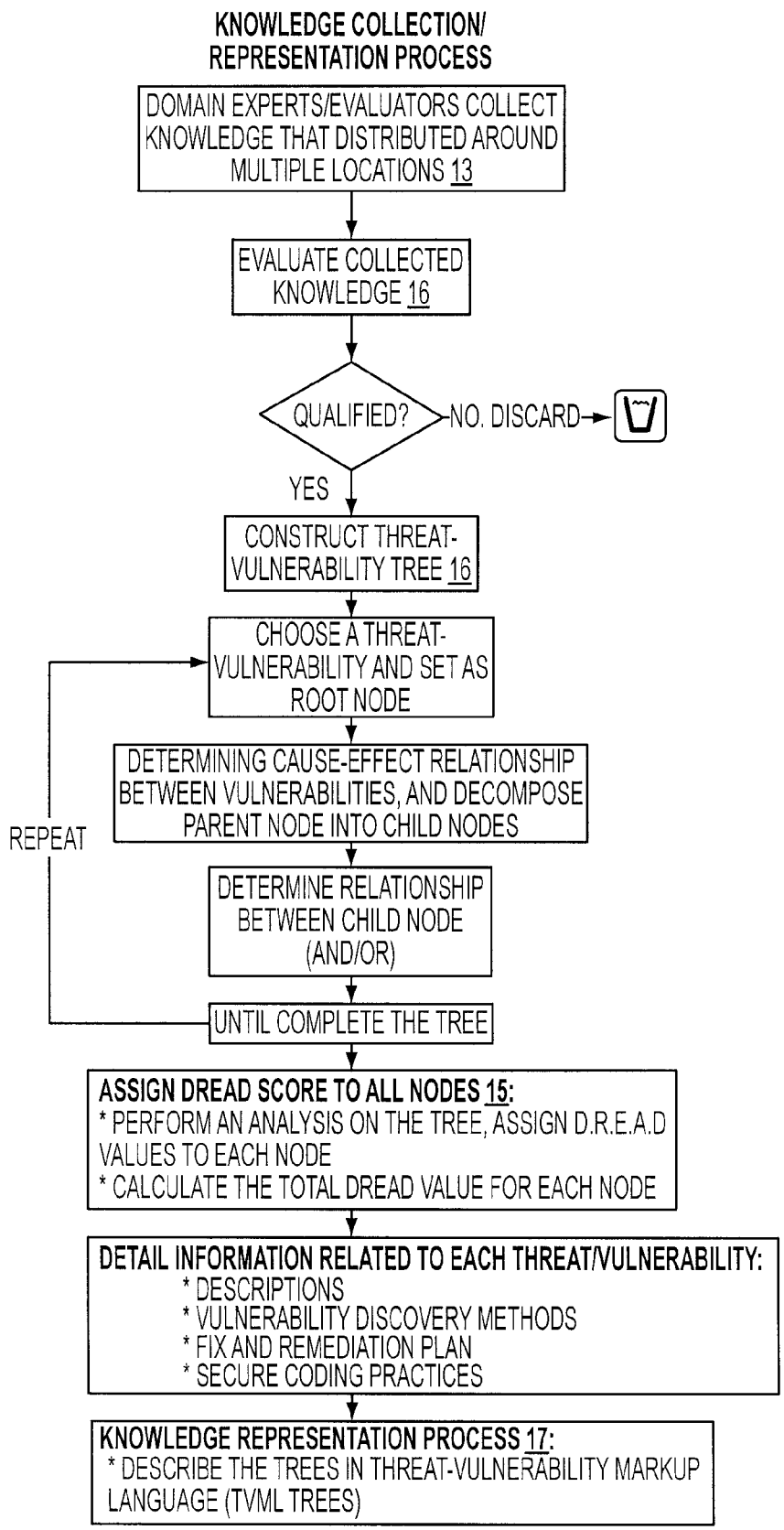
FIG. 8 is a flow chart representing the Knowledge Collection/Representation Process according to at least one aspect of the invention.

FIG. 2 shows a diagrammatic representation of a Knowledge-Based Collaborative System 2 for web application security assessment. As can be seen in the FIG. 2, the Knowledge-Based Collaborative System 2 includes several components. One component of the system is the Knowledge Collection and Representation component 10. This component of the system captures, retains, and organizes knowledge into a unified and useful system. This system allows for the high level knowledge and expertise of experts to be organized and stored in a useful manner. This component 10 is designed for knowledge input, manipulation, editing, storage and eventually presentation of the knowledge in other forms for reuse. This component 10 also allows for integration of such knowledge into other components of the system by organizing the knowledge and putting in a standardized format. FIG. 8 is an illustrative example of the process for Knowledge Collection and Representation. As shown in FIG. 8 the Domain Experts/Evaluators 14 collect knowledge 13 that is distributed around multiple locations. The Domain Experts/Evaluators 14 then evaluate the knowledge and determine whether it is qualified or should be discarded. If the knowledge is qualified it is used to construct a Threat Vulnerability Tree 16. The process of constructing the TVT includes choosing a threat or vulnerability and setting it as the root node. Then the cause and effect relationships between vulnerabilities are determined and the parent root node is broken down into child nodes. Then the relationships between the child nodes is determined and assigned. Such relationships may be represented for example by "AND" or "OR". This process is repeated until the tree is completed. Once the TVT is constructed, a rating analysis is performed on the TVT and ratings are assigned 15 to all the nodes. The total rating is calculated for each node. The TVT may include or contain links to detailed information for each threat or vulnerability. Such detailed information may include descriptions of the threats or vulnerabilities, discovery methods for the threats or vulnerabilities, remediation plans of fixes, and secure coding practices. The tree is described in a language, such as Threat Vulnerability Markup Language (TVML).

Figure 9:
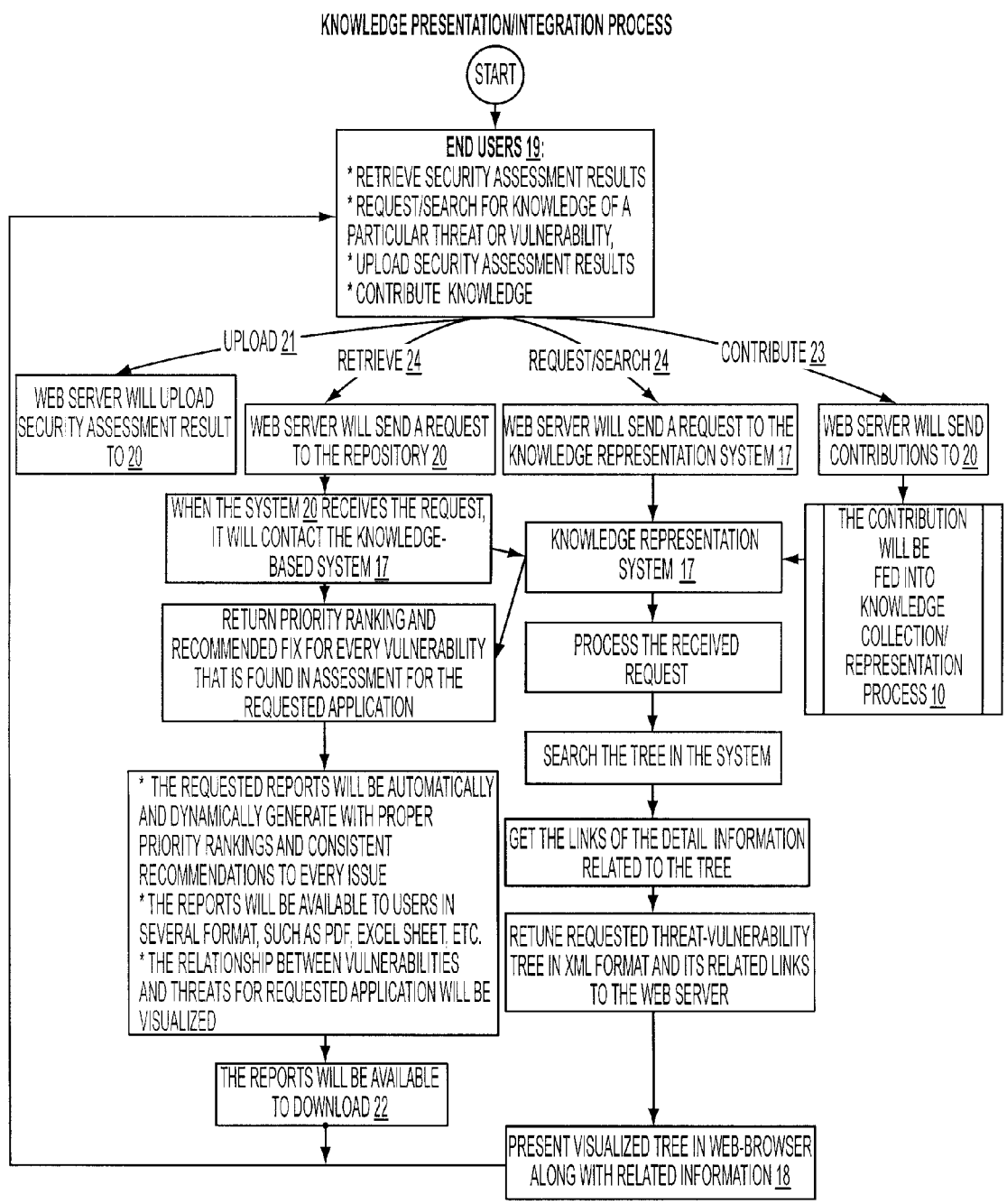
FIG. 9 is a flow chart representing the Knowledge Presentation/Integration Process according to at least one aspect of the invention.

As can be seen in FIG. 2, another component of the Knowledge-Based Collaborative System 2 is the Knowledge Presentation component 11. The Knowledge Presentation Component 11 presents information to explicitly show the relationships between a large numbers of diverse elements, to facilitate reasoning services, perform graphical analysis, and allow knowledge sharing. In addition, it also has a knowledge collection channel. The channel allows for contributions which work their way into evolving the system and enriching the knowledge base. Another component of the Knowledge-Based Collaborative System 2 is the Knowledge Integration component 12. The Knowledge Integration component 12 brings knowledge together, weaving such knowledge into forms not only more organized, accurate and accessible, but also weaves knowledge into forms that are more useful for discovering and solving the potential security problems. It brings knowledge into a coherent structure, helps to expand the scope of thinking and synthesize diverse perspectives. In the micro view, it brings domain expertise into the security assessment process to assist potential security vulnerability discovery, to ensure consistency among every assessment, to enhance quality of security analysis. FIG. 9 is an illustrative example of the process for Knowledge Presentation and Integration. As shown in FIG. 9 in this process end users 19 perform several functions. For example, the end users 19 retrieve security assessment results 21, request or search for knowledge of a particular threat or vulnerability 24, upload security assessment results 21 or contribute knowledge 24. In the first instance of retrieving security assessment results 24, the web server sends a request to the repository 20. When the system receives the request, it contacts the knowledge based system 17. The Knowledge-Based system 17 returns priority ranking and recommended fix for every vulnerability that is found in the assessment for the requested application. The requested reports automatically and dynamically generate with proper recommendations to every issue. The reports are available to users in several formats, such as PDF, Excel® sheet, etc. The relationships between the vulnerabilities and the threats for the requested results are visualized. Then the reports 22 are available to download. In the second instance of requesting or searching for knowledge of a particular threat 24, the web server sends a request to the Knowledge Representation system 17. The Knowledge Representation system 17 processes the request and searches the tree in the system to get the links of the detailed information related to the tree. The requested Threat Vulnerability Tree in XML format along with its related links is sent to the web server. The TVT is presented visually in the web browser along with related information 18. In the third instance, uploading security assessment results 21, the web server uploads security assessment results to the repository 20. In the forth instance, contributing knowledge 24, the web server sends contributions to the repository 20. The contribution is fed into the Knowledge Collection/Representation Process 10.

Fragmented and disconnected knowledge 13 includes knowledge scattered among written texts and spread across department and disciplinary boundaries such as the intranet and Internet. Domain Experts/Evaluators 14 are people with special knowledge or skills in particular application security areas. They are primarily responsible for acquiring and evaluating the knowledge in the Knowledge-Based Collaborative system 2, and maintaining the integrity of the knowledge. They are also responsible for manipulating the assimilated knowledge into a format or standard that is designed for further integration.

Another component of the Knowledge-Based Collaborative System 2 is the component for prioritizing threat/vulnerabilities with ordinal scale values 15. Such an ordinal scale may be a third party scoring system. For example, a modified Microsoft® DREAD (Damage, Reproducibility, Exploitability, Affected users, Discoverability) method may be used. In an example of a modification of the DREAD system, the ordinal scale values of 1-4 are assigned to all threats or vulnerabilities.

As can be seen in FIG. 2, another component of the Knowledge-Based Collaborative System 2 is the component for Threat-Vulnerability Tree (TVT) construction 16. This component 16 is where domain experts/evaluators 14 translate knowledge into several TVT logic diagrams. A TVT is based on classic fault tree principle. A TVT represents a graphical model of the pathways within a system wherein vulnerabilities may lead to foreseeable threats. The pathways interconnect contributory events and conditions using standard logic symbols (for example, AND, OR, etc.). A TVT may contain detailed information of a vulnerability such as the discovery methods, the fix/remediation plan for this vulnerability, and information of secure coding practices. The TVTs are described and represented in a Threat-Vulnerability Markup Language (TVML). The Threat-Vulnerability Markup Language is an Extensible Markup Language (XML) format that specifically describes Threat-Vulnerability relationships, associated attributes and linkage to related detailed information for each node (vulnerability) in the TVT. TVML is a language that may be read and used by other programs. Also, it is platform independent and may be verified, validated and easily editable.

As can be seen in FIG. 2, another component of the Knowledge-Based Collaborative System 2 is the component for collaborative knowledge sharing 18. This collaborative knowledge sharing channel 18 may be a web-based tool. The channel is built upon technologies Java/JSTL, and XML related XSLT/Xpath/Xpoint/Xlink/XML query, and web visualization technology Scalable Vector Graphics (SVG). Therefore, the knowledge collected and represented in 17 may be presented in web browsers using Internet technology. For example, the channel may present the TVTs in graphical form so a user may more fully understand the relationships between threats and vulnerabilities. Further, these graphical TVTs are interactive. For example, every node in the TVT has link to detailed information associated with typical Threat/Vulnerabilities such as cause-effect relationship between the threat and vulnerability, discovery of threats or vulnerabilities, strategies in creating software which avoid vulnerabilities and protect against threats.

As seen in FIG. 2, the Knowledge-Based Collaborative System 2 also includes end users 19 which are security analysts, security consultants, business and application owners, software designers/developers/administrators and other users who are interested in application security.

Further, the system includes a repository system 20 which may be similar to the repository 6 described above. However, this repository system 20 includes integration of the priority ranking for each threat/vulnerability, the relationship between threats and vulnerabilities and detailed information for each threat/vulnerability described in 17. This linkage helps to both increase the quality of security assessment and eliminate inconsistency that exists in the system.

The system also includes security analysts 21 who may be the same group as 4 in the above described system 1. They perform security analysis and discover vulnerabilities and threats in applications.

In this system, the domain experts' knowledge is integrated into the reporting component 22. This results in high quality assessment reports with consistent priority rankings, relationship descriptions and recommendations. The shortcoming described in component 5 of the system 1 is overcome as a result of integration of a knowledge-based system. For example, the reports use uniform standard and language for the assessing and describing the threats and vulnerabilities. Also, there is a uniform ranking system. Therefore, the reports are not based on an individual assessor's assessment. Hence, there is less discrepancy and variance among the reports. The integration with the knowledge base has allowed the assessment to reap the benefit of the collaborative and knowledge-based effort rather than relying on an individual assessor.

This system also includes a feedback loop 23 for collaborative development by a number of security domain experts. This feedback loop 23 keeps the system knowledge up-to-date and provides the ability for the system to continually grow.

As seen by the arrow 24, the system 2 also allows the web-based presentation channel for end users 19 to use the advanced visualization techniques & components in 10 and retrieve assessment results 22.

Now that an overview of the Knowledge-Based Collaborative system 2 has been given, several aspects of the Knowledge-Based Collaborative system 2 will be described in further detail. These features include a Threat-Vulnerability Tree, the prioritizing/rating of threats and vulnerabilities using ordinal scale values, Threat-Vulnerability Markup-Language, Integration and the Collaborative Knowledge Presentation Tool.

As described above, the knowledge-based system uses Threat-Vulnerability Trees (TVTs or "trees") to describe web application threats and vulnerabilities. The TVT provides a structured and reusable format, or standard, by which the threats, vulnerabilities and the relationship between the threats and vulnerabilities may be expressed using a hierarchical order. Specifically, TVTs attempt to integrate all vulnerabilities that lead to threats in a system into a logical diagram. A TVT follows a top-down structure and represents the pathways within a system that may lead to foreseeable, undesirable loss events. The pathways interconnect contributory events and conditions using standard logic symbols (AND, OR, etc.).

The creation of a TVT is based on skilled and experienced engineers/security analysts' tests and judgment. The main building blocks of a TVT are nodes. Each TVT has a single root node which may represent either a threat or a vulnerability. For example, a TVT of "Cross-Site Scripting" is an example of a TVT which has a threat as a root node. Alternatively, a TVT of "poor input/output validation" is an example of a TVT which has a vulnerability as a root node. The threat could be caused by combination of vulnerabilities (nodes, leaf nodes). Alternatively, a vulnerability could lead to many threats (leaf nodes). Therefore, it is sometimes useful to logically define a threat or a vulnerability into different TVTs. Using the examples above, the TVT of "Cross-Site Scripting" is an example of a TVT wherein a threat is caused by many vulnerabilities while the TVT of "poor input/output validation" is an example of a TVT wherein a vulnerability leads which to many threats.

The first step in creation of a TVT is to identify the possible vulnerabilities and threats and then categorize them into logical groups. In creating a TVT, one may narrow the scope. It is useful to define the top undesired event as precisely and narrowly as possible. Also, it is useful to use consistent nomenclature. Consistent naming for vulnerabilities or threats allows a logical connection to occur in multiple branches of the tree, or multiple trees. This prevents confusion.

The tree may be developed with a manageable level of detail. Therefore, a tree may contain sub trees. Also, it is sometimes useful to create a TVT with known assumptions. For instance, the trust boundary of the system is clearly defined or the physical security is assumed sound or the network security is not considered. At the same time, during creation of a TVT with such assumptions, the designer could leave a sub-tree node for future expansion on such issues.

Figure 3:
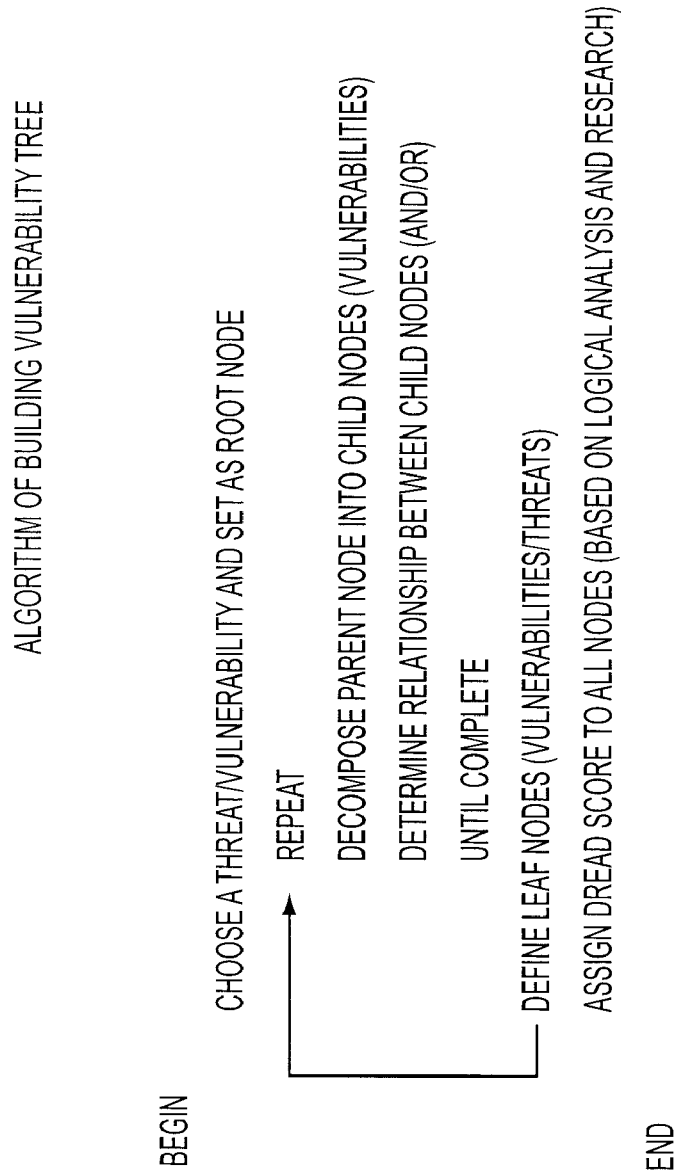
FIG. 3 is an example of an illustrative example of a process for creating a Threat Vulnerability Tree according to at least one aspect of the invention.
Figure 4:
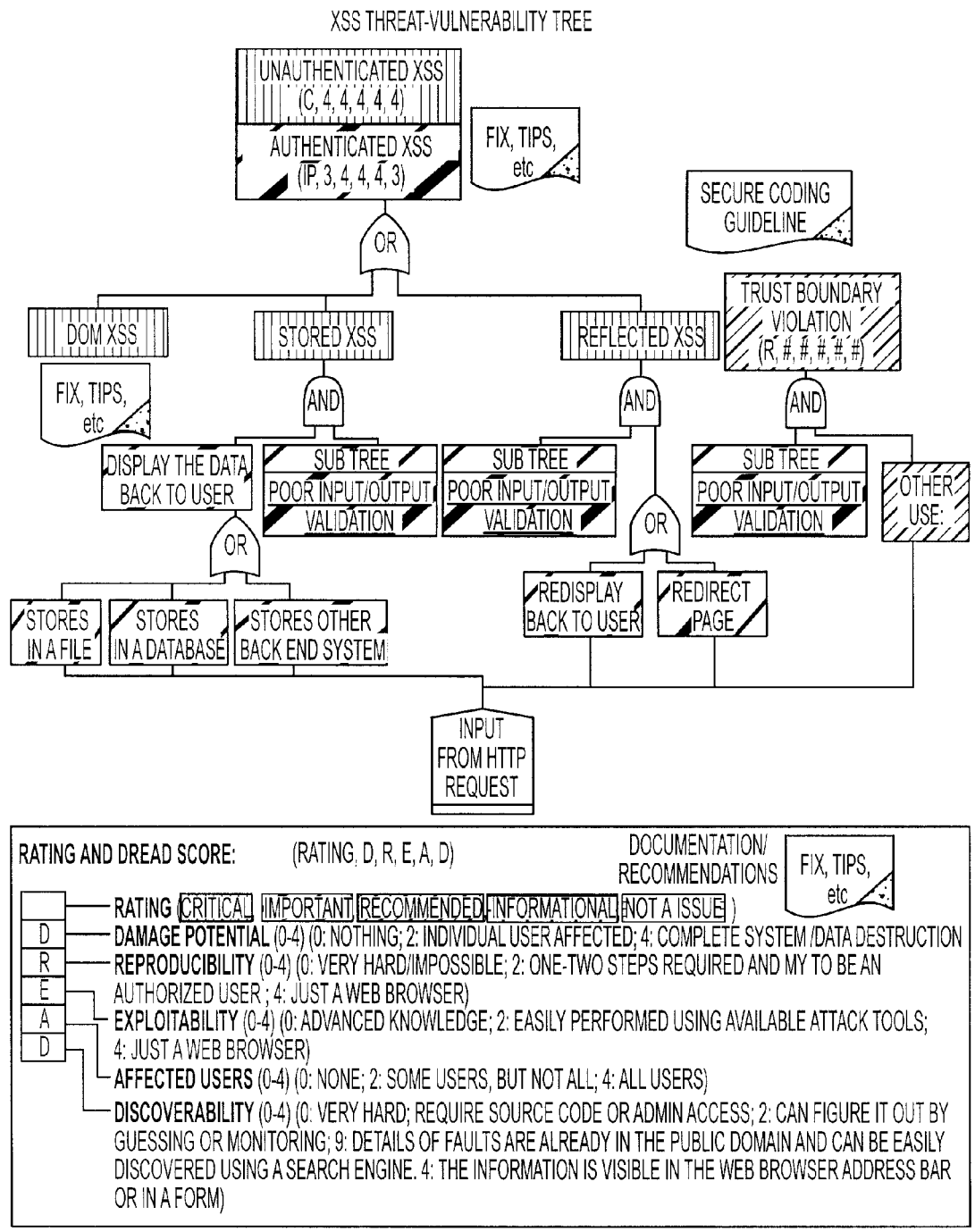
FIG. 4 is an example of an illustrative example of a Threat Vulnerability Tree according to at least one aspect of the invention.
Figure 5:
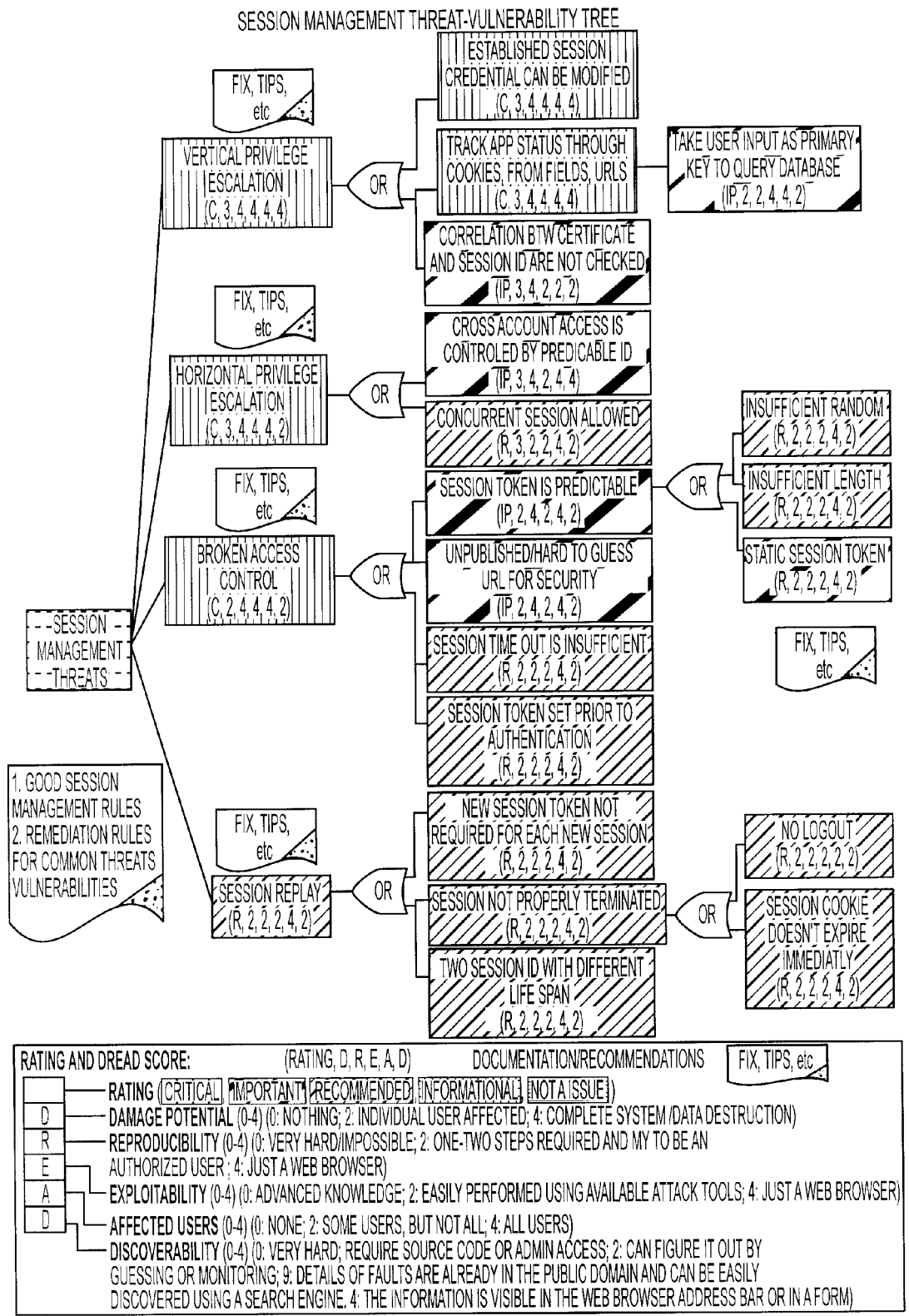
FIG. 5 is an example of an illustrative example of a Threat Vulnerability Tree according to at least one aspect of the invention.

FIG. 3 shows a potential algorithm for building a threat vulnerability tree. Further, there are two examples of TVTs provided for reference. FIG. 4 is a Threat Vulnerability Tree for Cross Site Scripting (XSS). In regard to FIG. 4, the root node is threat—XSS that is listed by three basic XSS (DOM, Reflected and Stored) type. Each type of XSS is caused by different vulnerabilities in the code in combination with the vulnerability "poor input/output validation" that is listed as a sub tree. It is noted that the DREAD score in the diagram is just for explanation purposes. FIG. 5 is a TVT for Session Management.

A threat/vulnerability's level of overall risk is based on multiple attributes such as the severity, potential damage, and its likelihood of occurring, etc. Each of these attributes may be rated on a relative ordinal scale such as 1-10. The overall risk is determined by performing a mathematical calculation on the attribute values. For example, the mathematical calculation could result in a mean average or a sum. The result of the calculation is assigned to a given threat/vulnerability. Once the TVT is built, security experts need to determine the vulnerability/threat impact to a system.

The Microsoft® DREAD model is one method to sort risks and assign a value for a given threat/vulnerability by using simple math described below. Any value may be assigned to the leaf nodes or root node, and then propagated up/down the tree structure in the same manner. The basic concept of the DREAD risk model and algorithm is used to compute a risk value, which is an average of the five categories described below:
(1) Damage Potential—If a threat exploit occurs, how much damage will be caused?
(2) Reproducibility—How easy is it to reproduce the threat exploit?
(3) Exploitability—What is needed to exploit this threat?
(4) Affected Users—How many users will be affected?
(5) Discoverability—How easy is it to discover this threat?

$$Risk\_DREAD=(DAMAGE+REPRODUCIBILITY+EXPLOITABILITY+AFFECTED\ USERS+DISCOVERABILITY)/5$$

According to the original DREAD concept, the calculation always produces a number between 0 and 10 on an ordinal scale; the higher the number, the more serious the risk. Some examples of how to quantify the DREAD categories are listed below.
Damage Potential
  0=Nothing
  5=Individual user data is compromised or affected.
  10=Complete system or data destruction
Reproducibility
  0=Very hard or impossible, even for administrators of the application.
  5=One or two steps required, may need to be an authorized user.
  10=Just a web browser and the address bar is sufficient, without authentication.
Exploitability
  0=Advanced programming and networking knowledge, with custom or advanced attack tools.
  5=Malware exists on the Internet, or an exploit is easily performed, using available attack tools.
  10=Just a web browser
Affected Users
  0=None
  5=Some users, but not all
  10=All users
Discoverability
  0=Very hard to impossible; requires source code or administrative access.
  5=Can figure it out by guessing or by monitoring network traces.
  9=Details of faults like this are already in the public domain and can be easily discovered using a search engine.
  10=the information is visible in the web browser address bar or in a form.

Figure 7:
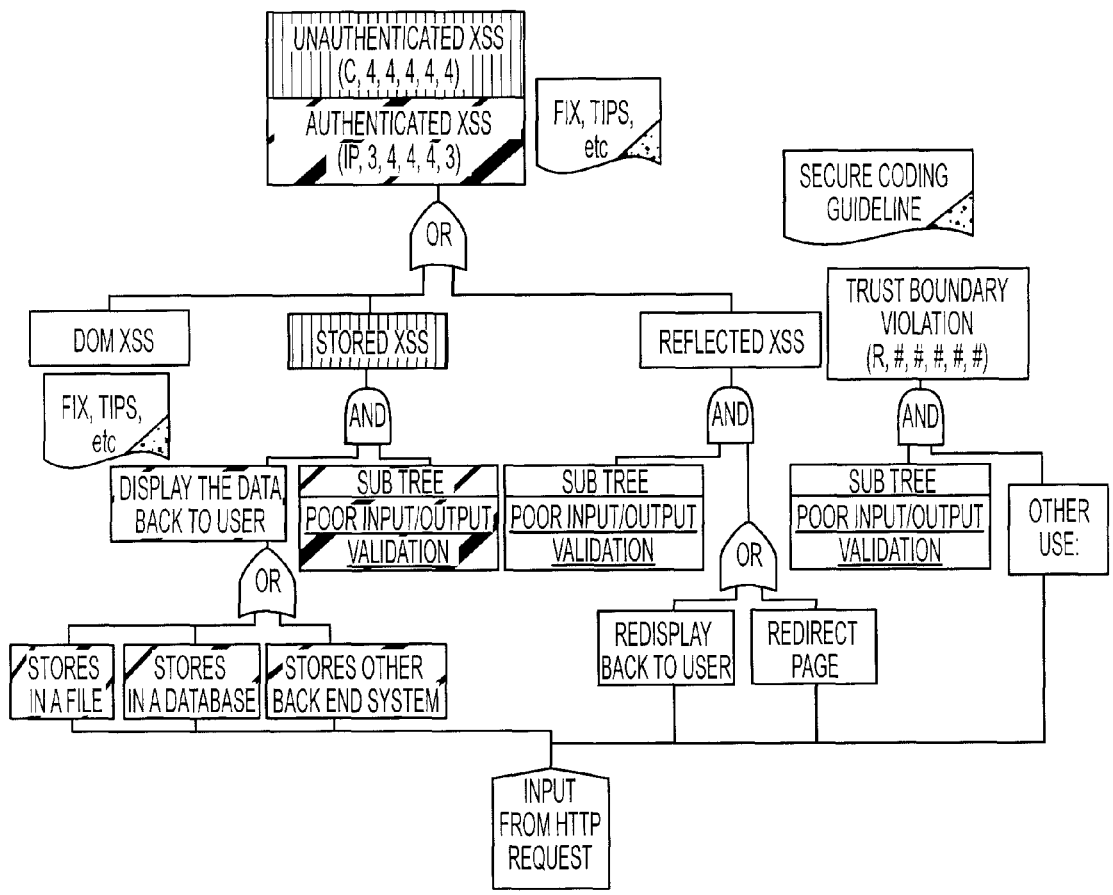
FIG. 7 is an example of the XSS Vulnerability Tree with a listing of associated modified DREAD scores according to at least one aspect of the invention.

When performing a security review of an existing application, "Discoverability" often is set to 10 by convention, as it is assumed the threat issues will be discovered. However, 0-10 ordinal scale has proven to be too subjective when comes down to assign ratings to threats/vulnerabilities. Since the rate is ordinal scale, there is no notion of "unit distance" between objects in an ordinal scale. Therefore, changing the scale from 0-10 to 0-4 better accommodates the rating system we are using for security assessment and preserves the meaning of relative mitigation priority. In this case, each of this ordinal value may be mapped into the relative scale: 4—CRITICAL; 3—IMPORTANT; 2—RECOMMENDED; 1—INFORMATIONAL; 0—not an issue. This modified DREAD score assignment is the result of painstaking research on potential or exploitable threats. FIG. 7 gives an example of the XSS Vulnerability Tree with a listing of associated modified DREAD scores.

The Knowledge-Based Collaboration system may use a Threat-Vulnerability Markup Language (TVML) to describe threat and vulnerability relationships. This TVML may ensure security analysts refer to threat-vulnerability models of web application systems in a consistent and uniform manner. TVML is an Extensible Markup Language (XML) with particular meaning and rules (grammar) for the purpose of describing threat and vulnerability relationships. XML is a meta-language for creating other languages and therefore allows construction such a markup language that may be used to describe TVTs. It achieves this by providing a means of creating markup (also called tags), which may then be embedded in a document to describe its structure. The particular meaning and rules (grammar) given to the tags are described in a Document Type Declaration (DTD).

XML is a preferred language to describe TVTs because XML is a language that may be read and used by other programs. Also, XML is platform independent and may be verified, validated and easily editable. In addition, the XML based TVT could be easily translated to the data representation of a number of tools for graphical viewing. Also, an XML-based TVT consists of only five tags.

The tags and attributes of TVML are described with reference to the table shown in FIG. 6. As shown in this table, Vulnerability is associated a name, a rating, a group of DREAD score, and associated recommendation/tips/fix documentation. The logic relationship among parallel vulnerabilities such as AND or OR is presented in <P> tag. Sub Tree is present in the <Sub_TVT> tag. The name is associated with the name of a tree. When the TVT is displayed in a web browser, the name is underlined, indicating that these are clickable links when displayed in a web browser or a Sub Tree. Clicking on the links brings up the corresponding sub tree for the vulnerability type or the documentation of remediation for the vulnerability.

Also as shown in FIG. 6, the Name of Vulnerability and the Sub Tree adopt the convention of always using the name with underscores to connect every word. The convention proves to be convenient later on in order to use the name as a variable in programming to transfer a TVT and its attributes into other applications.

Logic Relation among all vulnerabilities under the same gate may be expressed in parallel element under <P> tag. The DID (Documentation ID) is the unique ID that links between the vulnerability/threat and documentation of recommendations, fix tips and secure coding guideline. The set of documentations are written as standard text files, which make is easy to edit, to be transformed into other format and to be presented.

The TVML DTD is a file that contains the necessary rules that to the TVML follows. In other words, the DTD is the "grammar" that the TVML document must abide by in order to be a valid TVML file. The following are examples of rules for writing valid TVML.
"tvml"—is the root node of Threat-Vulnerability Tree. There must be exactly one "tvml" tag per TVT file.
"TVT"—there must be exactly one TVT tag with an opening TVT tag and the closing tag.
$V^+$—There must at least one V (Vulnerability) tag per TVT file. If there is more than one V tag, it must be enclosed by either an S or a P tag.
S—an S (Series) tag must enclose either: (1) a V tag followed by another V or a V followed by a P, or (2) a P followed by either a V, S, or another P tag.

P—P (Parallel) tag must enclose either (1) a V followed by either another V, an S, or a P, or (2) an S followed by either a V, another s, or a P, or (3) a P followed by either a V, an S, or another P.

Sub Tree—There must be zero or more SubTree tags per TVT file. It must be enclosed by either an S or a P tag.

An XML-based Threat-Vulnerability Tree consists of only five tags, and therefore may be easily integrated with information systems with associated penetration testing and secure source code review findings. For example, threats and vulnerabilities found in penetration testing and source code review may be stored in a database and presented in a web browser in tablet format. Connecting these findings with the Knowledge-Based system may be easily implemented through linking Threat/Vulnerability name and TVTs in which that Threat/Vulnerability name is located. Such linkage helps to generate higher quality assessment reports, because the threat/vulnerability findings are rated through the Knowledge-Based system automatically. A substantial advantage of this integration is that a rating is assigned to a threat/vulnerability automatically. In other words, the rating assigned to each threat/vulnerability is the value that is already in the Knowledge-Based system. Also, linked with the rating in the Knowledge-Based system are the remediation strategy that consists of recommendations, fix tips, secure coding practices and more. Another substantial advantage of the integration is the consistency of rating and remediation strategy. In other words, the integration provides a consistency in the assessment results across all assessed web applications. This improves the quality of assessment reports that are generated by the system.

Another advantage of the integration is that the web application security assessment results may be visualized. The TVTs in the knowledge-based system are compared to a list of criteria (existing findings of an application). The TVT may be easily transformed from a typical TVT into a particular web application TVT. This transformation is beneficial because the visualization of security assessment results in TVT structure may be quite useful. It visually presents the web application vulnerabilities and their causes. Visualization of assessment results may gain a fresh perspective on the application vulnerabilities.

Security analysis and web application development are two different areas of software development. Therefore, developers usually don't identify commonly occurring vulnerability patterns at application levels. As stated above, by sharing web application security knowledge with developers, etc. during design and development of the web application, vulnerabilities in the web applications could be avoided. The Knowledge-Based system may provide such knowledge of typical vulnerabilities and strategies to developers, etc. at an early stage in the development of the web application. In order to make such expert knowledge available to developers, etc. the Knowledge-Based system may include a web-based collaboration tool. The web tool provides a common place where both security and development people may collect, organize, and share their security related knowledge in a consistent way. Further, the tool provides answers to problems, offer recommendations to software design architects, supply secure coding practices or remediation strategies to developers, give tips to discover vulnerabilities in a Question and Answer process, etc.

Further, the web collaboration tool may be built on technologies that relate to XML (such as XSLT, Xpath, XML query language, a web-scripting language such as JSP/JSTL technology, and Scalable Vector Graphics [SVG] which is a language for describing two-dimensional graphics and graphical applications in XML). With the web-scripting and SVG language, the tool may be enabled to support of generating graphics, as well as other type of documents such as PDF to create interactive environment for users. As we mentioned above, XML is a language that may be parsed and manipulated by other programs.

The web collaboration tool is able to extract knowledge from TVTs that are written in TVML and present the knowledge in web browsers. This is advantageous because it may generate the TVT graphically. This allows the user to see the TVT in a "tree-like" graphic which graphically shows the relationships between, for example, threats and vulnerabilities. This graphical representation is easier for a user to actually visualize and understand the TVT. Another advantage of this tool is that the graphical TVT provides clickable links to the documents containing recommendations fix tips and secure coding practices that relate to particular vulnerability/threat. Therefore, in reviewing the TVT of a particular vulnerability/threat, the user would merely have to do click on the link and they would be provided with the documents containing recommendations fix tips and secure coding practices, etc. These documents may be displayed, edited in web browsers by a number of security experts, system and application experts. Another advantage of the web collaboration tool is that it is searchable. Therefore, particular content may be easily located. Further the content may be publicly editable.

In conclusion, advantages of the Knowledge-Based Collaborative System include a collaboration of security experts' knowledge which comes from painstaking research, experiences, brainstorming and evaluation of threats/vulnerabilities. This system allows for experts in different areas to combine all this knowledge in an organized fashion which benefits the entire system. Also, the system provides the advantage of a standard approach to assessing the security of web applications. This standard approach includes a uniform language (TVML), assessing technique (TVT) and rating system. Further, the standardization of such knowledge allows for integration of the assessments and knowledge with other systems. This integration allows the knowledge to be efficiently organized and presented. For example, the knowledge may be linked to other parts of the system or the information may be integrated into a graphical form which allows for easier understanding of the information and the relationships between the threats and vulnerabilities. Both the linkage and the graphical presentation of the knowledge may give a clearer understanding to those attempting to learn.

Advantages of a web based collaboration tool include the ability to capture the Threat Vulnerability Tree from the Knowledge Collection component of the system and present the Threat-Vulnerability Tree in a graphical manner which visualizes the relationship between the threats and vulnerability dependency. Further, this tool is a medium for communication and sharing of web application security knowledge among security experts and the people who develop, design and maintain applications. The tool also allows for a collaborative development by a number of security experts. This keeps the system knowledge up-to-date and provides the ability to continually grow. Finally, the tool allows for the public user to contribute, manage and edit such knowledge.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the features of the aforementioned illustrative examples may be utilized alone or in combination or subcombination with elements of the other examples. It will also be appreciated and understood that modifications may be made without departing from the true spirit and scope of the present invention. The description is thus to be regarded as illustrative instead of restrictive on the present invention.

The invention claimed is:

1. A system for assessing web application security comprising:
   a knowledge collection and representation component;
   a knowledge presentation component;
   a knowledge integration component configured to synthesize knowledge about threats and vulnerabilities to web applications from both experts and end users; and
   a non-transitory computer readable medium containing the knowledge about threats and vulnerabilities to web applications,
   wherein the knowledge collection and representation component includes
      a component configured to organize the knowledge about threats and vulnerabilities to web applications into a standard format which relates said threats and vulnerabilities in a hierarchical manner; and
      a component configured to rate the vulnerabilities and threats according to a standard rating system,
   wherein said standard format for relating threats and vulnerabilities is a threat-vulnerability tree which includes a root node and at least one other node which represent the threats or vulnerabilities,
   wherein the knowledge presentation component includes a web based system configured to present the threat-vulnerability tree in a graphical format,
   wherein each node in the graphical format of the threat-vulnerability tree includes a link to detailed information including at least one of: a cause-effect relationship between the threat and vulnerability, discovery of threats or vulnerabilities and strategies in creating software which avoid vulnerabilities and protect against threats,
   wherein knowledge integration component includes a repository system configured to store the detailed information including at least one of: a cause-effect relationship between the threat and vulnerability, discovery of threats or vulnerabilities and strategies in creating software which avoid vulnerabilities and protect against threats,
   wherein the repository system configured to provide the detailed information when the link of the node in the graphical format of the threat-vulnerability tree is accessed.

2. The system of claim 1, wherein the threat-vulnerability tree is created with a computer language specifically designed to describe the threat and vulnerabilities and their relationships so that the threat and vulnerabilities are referred to in a consistent manner throughout the system.

3. The system of claim 2, wherein the system contains a plurality of threat vulnerability trees which may be incorporated together via the knowledge integration component of the system.

4. The system of claim 1, wherein the system incorporates a uniform standard for scoring and rating vulnerabilities and threats.

5. The system of claim 1, wherein the repository system stores the knowledge organized by the knowledge collection and presentation component and wherein the knowledge integration component integrates the knowledge to link the knowledge together with other knowledge in the repository.

6. The system of claim 5, wherein the knowledge integration component integrates the knowledge of the knowledge collection and representation component with the knowledge presentation component.

7. The system of claim 1, wherein the web based system is interactive and allows a user to provide feedback to the system.

8. The system of claim 6, wherein the knowledge integration component integrates a threat vulnerability tree of the knowledge collection and representation component into a graphical embodiment of the threat vulnerability tree so that the graphical embodiment of the threat vulnerability tree is presented via the knowledge presentation component.

9. A computer assisted method of assessing web application security comprising:
   electronically receiving knowledge from both experts and end users about web application security including information regarding threats and vulnerabilities of web applications;
   determining whether the knowledge is qualified;
   discarding knowledge that is not qualified;
   organizing the qualified knowledge and generating at a computer a threat-vulnerability tree which includes a root node and at least one other node which represent the threats or vulnerabilities;
   assigning a rating to each of the threats and vulnerabilities based on a uniform rating system;
   electronically storing the organized knowledge in a non-transitory computer readable medium;
   integrating the organized knowledge into a presentation system; and
   electronically presenting the knowledge to users through a web based tool configured to present the threat-vulnerability tree in a graphical format,
   wherein the threat-vulnerability tree in a graphical format includes a link associated with each node of the threat-vulnerability tree, wherein the link provides access to detailed information electronically stored in a repository, wherein the detailed information includes at least one of: a cause-effect relationship between the threat and vulnerability, discovery of threats or vulnerabilities and strategies in creating software which avoid vulnerabilities and protect against threats.

10. A standardized system for assessing security of web based applications comprising:
   a component configured to collect information regarding threats and vulnerabilities to web applications from several different sources including experts in different fields and end users and to collect information into a database;
   a component for organizing the information regarding threats and vulnerabilities to web applications into a uniform language;
   a component for expressing the information in a structured and uniform format of a hierarchical relationship between threats and vulnerabilities which includes threat vulnerability trees which include a root node and at least one other node which represent the threats or vulnerabilities;
   a component for rating the threats and vulnerabilities under a uniform rating system; and
   a component for integrating the information into both a non-transitory computer readable medium for storing the information and also a presentation component for presenting the information,
   wherein the presentation component includes a web based system configured to presents the threat vulnerability trees in a graphical format to demonstrate the relationships between the threats and the vulnerabilities,
wherein each node in the graphical format of the threat-vulnerability tree includes a link to detailed information including at least one of: a cause-effect relationship between the threat and vulnerability, discovery of threats or vulnerabilities and strategies in creating software which avoid vulnerabilities and protect against threats,
wherein the component for integrating the information into both the non-transitory computer readable medium and the presentation component includes a repository system configured to store the detailed information including at least one of: a cause-effect relationship between the threat and vulnerability, discovery of threats or vulnerabilities and strategies in creating software which avoid vulnerabilities and protect against threats,
wherein the repository system configured to provide the detailed information when the link of the node in the graphical format of the threat-vulnerability tree is accessed.

11. The system of claim 10, wherein the component for knowledge presentation is interactive and allows for feedback from a user to maintain the system with current information.

12. The system of claim 10, wherein the threat vulnerability trees contains sub-trees.

13. A system for assessing web application security comprising:
a knowledge collection and representation component;
a knowledge presentation component;
a knowledge integration component configured to enable end users to perform one of
retrieve security assessment results,
request or search for knowledge of a particular threat or vulnerability,
upload security assessment results, and
contribute knowledge to the system; and
a non-transitory computer readable medium containing the knowledge about threats and vulnerabilities to web applications,
wherein the knowledge collection and representation component includes
a component for organizing knowledge about threats and vulnerabilities to web applications into a standard format which relates said threats and vulnerabilities in a hierarchical manner; and
a component which rates the vulnerabilities and threats according to a standard rating system,
wherein said standard format for relating threats and vulnerabilities is a threat-vulnerability tree which includes a root node and at least one other node which represent the threats or vulnerabilities,
wherein the knowledge presentation component includes a web based system configured to present the threat-vulnerability tree in a graphical format,
wherein each node in the graphical format of the threat-vulnerability tree includes a link to detailed information including at least one of: a cause-effect relationship between the threat and vulnerability, discovery of threats or vulnerabilities and strategies in creating software which avoid vulnerabilities and protect against threats,
wherein knowledge integration component includes a repository system configured to store the detailed information including at least one of: a cause-effect relationship between the threat and vulnerability, discovery of threats or vulnerabilities and strategies in creating software which avoid vulnerabilities and protect against threats,
wherein the repository system configured to provide the detailed information when the link of the node in the graphical format of the threat-vulnerability tree is accessed.

14. The system for assessing web application security of claim 13, wherein the knowledge integration component is configured to enable end users to:
retrieve security assessment results,
request or search for knowledge of a particular threat or vulnerability,
upload security assessment results, and
contribute knowledge to the system.

* * * * *